(12) United States Patent
Ohshima et al.

(10) Patent No.: US 6,972,734 B1
(45) Date of Patent: Dec. 6, 2005

(54) MIXED REALITY APPARATUS AND MIXED REALITY PRESENTATION METHOD

(75) Inventors: Toshikazu Ohshima, Kawasaki (JP); Kiyohide Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,232

(22) Filed: Feb. 22, 2000

(30) Foreign Application Priority Data

Jun. 11, 1999 (JP) .................................. 11-164718
Jun. 11, 1999 (JP) .................................. 11-164719

(51) Int. Cl.⁷ .......................................... G09G 5/00
(52) U.S. Cl. .......................... 345/8; 345/9; 345/157; 463/31
(58) Field of Search .................... 345/7, 8, 9, 419, 345/157, 158, 169; 348/51, 52, 53; 703/1; 434/307 R; 463/31, 32, 33, 34

(56) References Cited

U.S. PATENT DOCUMENTS

| 4,988,981 | A | * | 1/1991 | Zimmerman et al. ....... 345/158 |
| 5,394,517 | A | * | 2/1995 | Kalawsky ....................... 345/8 |
| 5,590,062 | A |   | 12/1996 | Nagamitsu et al. ............ 345/8 |
| 5,796,991 | A | * | 8/1998 | Shimizu ........................ 703/1 |
| 6,084,557 | A | * | 7/2000 | Ishida et al. .................. 345/7 |
| 6,151,060 | A | * | 11/2000 | Tabata ........................... 345/8 |
| 6,278,418 | B1 | * | 8/2001 | Doi ............................... 345/7 |
| 6,411,266 | B1 | * | 6/2002 | Maguire, Jr. .................. 345/8 |
| 6,441,815 | B1 | * | 8/2002 | McDowall et al. ......... 345/419 |
| 6,522,312 | B2 | * | 2/2003 | Ohshima et al. ............... 345/8 |
| 2001/0009478 | A1 |   | 7/2001 | Yamazaki et al. |

FOREIGN PATENT DOCUMENTS

| JP | 6-716131 | 6/1994 |
| JP | 7-073338 | 3/1995 |
| JP | 7-333551 | 12/1995 |
| JP | 11-84307 | 3/1999 |

* cited by examiner

*Primary Examiner*—Xiao Wu
(74) *Attorney, Agent, or Firm*—Fitzpatrick, Cella, Harper & Scinto

(57) ABSTRACT

This invention provides a mixed reality apparatus and mixed reality presentation method, which can present reality even when a plurality of players share a common mixed reality space. Virtual objects (41–47) are superposed to hide devices such as an HMD and the like that another player wears.

20 Claims, 16 Drawing Sheets

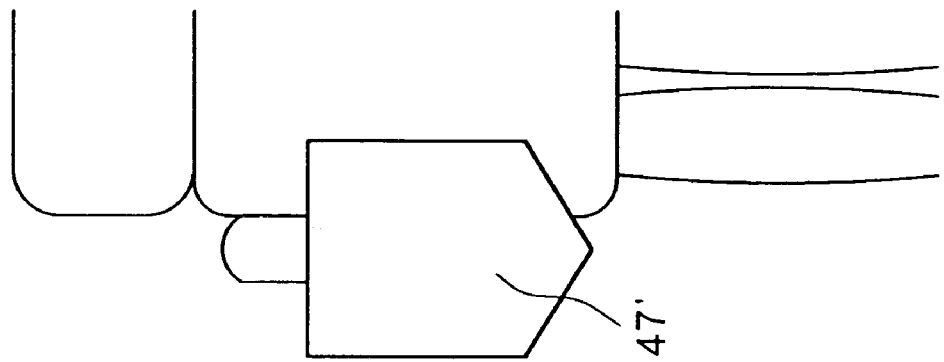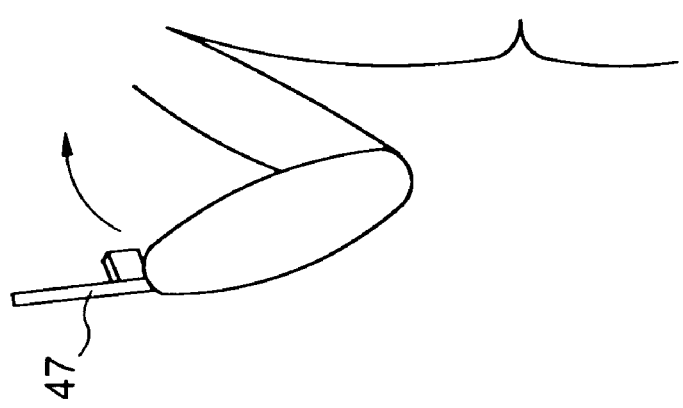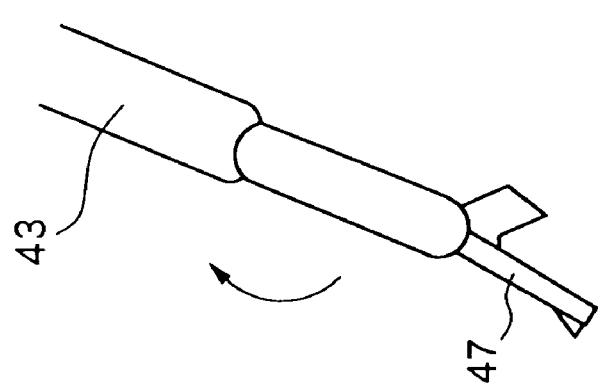

ANGLE a : ANGULAR DIFFERENCE BETWEEN VISUAL AXIS
DIRECTION OF PLAYER 1 AND DIRECTION TO PLAYER 2

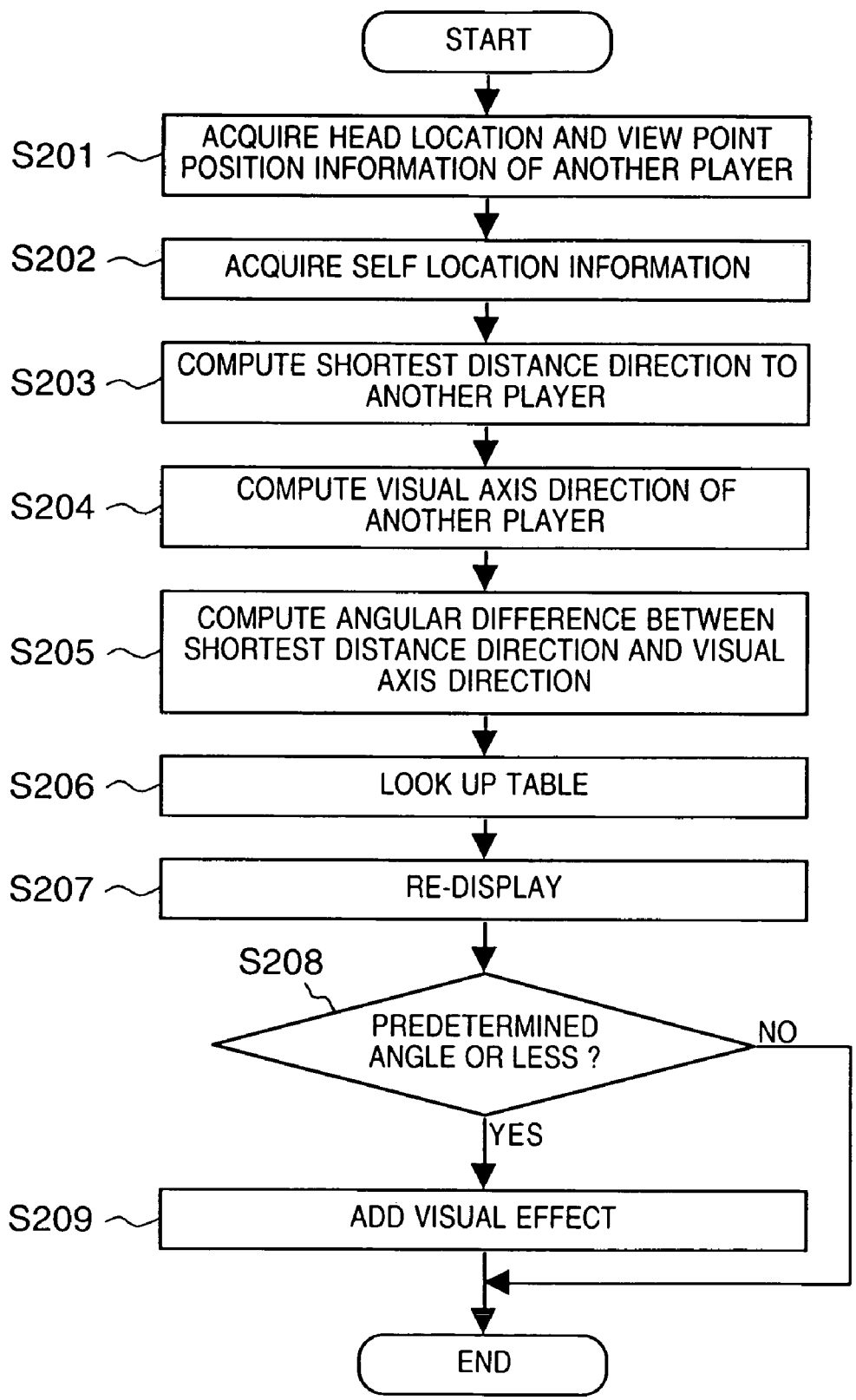

MIXED REALITY APPARATUS AND MIXED REALITY PRESENTATION METHOD

FIELD OF THE INVENTION

The present invention related to a mixed reality apparatus and mixed reality presentation method, which allow a given operator to easily recognize the state of another operator when a plurality of operators make predetermined operation while sharing a mixed reality space.

The present invention also relates to a pointer a display method, with which a pointer display does not disturb other objects even when there are a plurality of persons who make pointing inputs or even in a narrow space, and a pointed point and direction can be easily recognized.

BACKGROUND OF THE INVENTION

In recent years, Mixed Reality (MR) that aims at seamlessly coupling a real space and virtual space has been extensively studied. MR has received a lot of attention as a technique which aims at realizing coexistence of a virtual reality (VR) world that can be expressed in only a situation isolated from a real space, and the real space, and augments VR.

A typical apparatus for implementing MR is a head-mounted display (HMD). More specifically, MR is implemented by mixing and displaying real and virtual space on the HMD. MR schemes using the HMD include an optical see-through scheme for superposing a CG image or the like onto an image displayed on a semi-transparent (see-through) HMD, and a video see-through scheme for mixing a CG image or the like onto image data sensed by a video camera attached to an HMD, and then displaying the mixed image on the HMD.

MR can be used, quite possibly, in new fields which are qualitatively quite different from VR, such as a medical assist application for presenting the state inside the body of a patient to a doctor as if it were seen through, a job assist application for superposing and displaying the assembly sequence of a product on real parts in a factory, and the like.

(Game Application)

On the other hand, as an example in which a plurality of persons share an identical space and make operations in collaboration with each other using MR, a game disclosed in, e.g., Japanese Patent Laid-Open No. 11-84307 is known. Japanese Patent Laid-Open No. 11-84307 discloses an air hockey apparatus shown in FIG. 15 as a game apparatus using MR.

In an air hockey game, two players normally confront each other via a table, on which a puck floats by compressed air supplied from small holes formed in the table surface. Each player strikes back the puck by manually operating a mallet so as to shoot the puck into the opponent's goal.

In an air hockey game to which MR is applied, a puck is superimposed as a virtual object on a real space and is displayed on the players' HMDs to play an air hockey game.

(Arrangement of Game Apparatus)

FIG. 15 is a side view of an MR air hockey game apparatus.

In an MR air hokey game, two players 2000 and 3000 confront each other via a table 1000 while holding with their hands control boxes (260L and 260R), which are used as mallets. The two players 2000 and 3000 wear head-mounted displays (to be abbreviated as HMDs hereinafter) 210L and 210R on their heads.

Each control box (260L, 260R) has an infrared ray emitter at its distal end, and its two-dimensional position can be detected by processing an image captured by a CCD camera 230, which is provided above the table and detects infrared rays. If the control box has a specific shape or color, its position can also be detected by pattern recognition using such feature.

The HMD 210 is of, e.g., optical see-through type. The two players can directly observe the surface of the table 1000 even with the HMDs 210L and 210R. A two-dimensional virtual image is input from an image processing system (not shown) to the HMD 210. Hence, the players 2000 and 3000 observe a two-dimensional image displayed on the display screens of the HMDs 210 while being superposed on a real space observed via optical systems (not shown in FIG. 15) of the HMDs 210.

FIG. 16 shows an MR space observed by the left player 2000 via his or her own HMD 210L. Referring to FIG. 16, the opponent player 3000, table 1000, and the own body falling within the field of view, especially, the hand holding the control box, are recognized as real space images. On the other hand, an opponent's goal 1200R and a puck 1500 are displayed in a virtual space.

The two players move the real control boxes held in their hands to hit the virtual puck 1500 displayed by each other's image processing systems. The position of the virtual puck is computed by the image processing systems, and the puck is displayed in the players' HMDs so that it moves on the table while it is hit by the mallets and bounces off surrounding walls.

The HMD 210 each player wears is obtained by attaching a magnetic sensor 220 to an HMD main body disclosed in, e.g., Japanese Patent Laid-Open No. 7-333551 via a column 221. An arrangement in which a magnetic sensor and (or) camera are attached to an HMD can be applied not only to a video see-through HMD but also to an optical see-through HMD for the purpose of accurately detecting the head position and posture.

Each HMD 210 is fixed to the head of the player via a band (not shown). The magnetic sensor (220L, 220R) and a CCD camera 240 (240L, 240R) are fixed to the head of each player. The field of view of the camera 240 is set to observe a space in front of the player. In case of the air hockey game, since each player watches the upper surface of the table 1000, the camera 240 also senses an image of the surface of the table 1000. The magnetic sensor 220 (220L, 220R) senses a change in AC magnetic field generated by an AC magnetic field source 250.

When the player turns his or her face obliquely downward to watch the surface of the table 1000, he or she can see the surface of the table 1000, the aforementioned virtual puck 1500, the real mallet (control box 260), and the virtual goal 1200 (1200L, 1200R) in the field of view via the HMD 210. When the player moves to translate the head in the three-dimensional space or moves the head in a tilt, yaw, or roll direction, such change in head posture is detected by the magnetic sensor 220, and is observed as a change in image sensed by the CCD camera 240 accordingly.

Using the detected change in posture of the head, the display position of image data of the virtual space displayed in the HMD is changed. A marker may be formed on the table, and a signal indicating a change in posture can be corrected based on a marker image sensed by the camera 240.

(Pointer display)

On the other hand, when a predetermined position, object, or the like in an MR space is to be pointed, an image formed by combining planes such as a three-dimensional model image of a pointing rod or a simple rod which is used in a real space, or the like is used as a pointing rod in the MR space.

In the aforementioned MR air hockey game, both the players wear the HMDs, and cannot see each other's visual axis or line-of-sight directions. Also, the players can see devices they wear, resulting in poor reality.

Also, virtual space images (images of virtual objects) to be displayed are only a puck and goals, and their display contents (visual effects) and images change little.

Furthermore, since no information display such as the opponent player's name, records so far, current scores, and the like is made, it is hard to recognize the game state, opponent player level, and the like.

In addition, no processes for sharing an identical mixed reality space by three or more players are suggested.

In the MR space, when a predetermined position or object is pointed, since a model image of a three-dimensional object such as a rod or the like is used, the distance to that image is not easy to recognize. Also, when a plurality of pointing rods are present in a space, the displayed images are confusing. Also, since each rod is formed by planes, the visibility of overlapping portions is poor.

SUMMARY OF THE INVENTION

It is an object of the present invention to provide a mixed reality apparatus and mixed reality space image display method, which can solve the aforementioned problems and can assure reality even when a plurality of players share a common MR space.

It is another object of the present invention to provide a mixed reality apparatus and mixed reality space image display method, which allow a given player to easily identify the visual axis direction of another player.

It is still another object of the present invention to provide a mixed reality apparatus and mixed reality space image display method, which change display contents in correspondence with the state of each player, input commands, and the like.

It is still another object of the present invention to provide a mixed reality apparatus and mixed reality space image display method, which allow three or more players to easily experience identical MR.

It is still another object of the present invention to implement location display in a pointer display for pointing a location in an MR space.

More specifically, the gist of the present invention lies in a mixed reality apparatus for allowing a player to experience mixed reality by making the player visually confirm a mixed reality space obtained by mixing a real space and virtual space, comprising: detection means for detecting a location/posture of a predetermined portion of the player; and virtual space image generation means for rendering a virtual object to be superposed on the predetermined portion on the basis of the location/posture of the predetermined portion detected by the detection means, and generating a virtual space image.

Another gist of the present invention lies in a mixed reality apparatus comprising: a player processor, which is provided to each player, and includes location information detection means for detecting location information of a player, action detection means for detecting a predetermined action of the player, image generation means for generating a mixed reality space on the basis of information that pertains to another player, information that pertains to a real space, and information required for generating a virtual space image, and display means for making the player visually recognize the mixed reality space; and a controller to which a plurality of player processors are connected, and which has means for managing and controlling the mixed reality space, and distributes player information including the location information and predetermined action detection information detected by each of the connected player processors, information that is registered in advance and pertains to the real space, and information required for generating the virtual space image to at least the player processors other than the player processor as a source of the player information.

Still another gist of the present invention lies in a mixed reality presentation method for allowing a player to experience mixed reality by making the player visually confirm a mixed reality space obtained by mixing a real space and virtual space, comprising: the detection step of detecting a location/posture of a predetermined portion of the player; and the virtual space image generation step of rendering a virtual object to be superposed on the predetermined portion on the basis of the location/posture of the predetermined portion detected in the detection step, and generating a virtual space image.

Still another gist of the present invention lies in a mixed reality presentation method comprising: the player processing step for each player, and which includes the location information detection step of detecting location information of a player, the action detection step of detecting a predetermined action of the player, the image generation step of generating a mixed reality space on the basis of information that pertains to another player, information that pertains to a real space, and information required for generating a virtual space image, and the display step of making the player visually recognize the mixed reality space; and the control step which has the step of managing and controlling the mixed reality space, and distributes player information including the location information and predetermined action detection information detected in the player processing step, information that is registered in advance and pertains to the real space, and information required for generating the virtual space image to at least the player processing step other than the player processing step as a source of the player information.

Still another gist of the present invention lies in a storage medium which stores a mixed reality presentation program for allowing a player to experience mixed reality by making the player visually confirm a mixed reality space obtained by mixing a real space and virtual space, having: the detection program step of detecting a location/posture of a predetermined portion of the player; and the virtual space image generation program step of rendering a virtual object to be superposed on the predetermined portion on the basis of the location/posture of the predetermined portion detected in the detection step, and generating a virtual space image.

Still another gist of the present invention lies in a storage medium storing at least one of: a player processing program for each player, and which includes the location information detection program step of detecting location information of a player, the action detection program step of detecting a predetermined action of the player, the image generation program step of generating a mixed reality space on the basis of information that pertains to another player, information that pertains to a real space, and information required for generating a virtual space image, and the display program step of making the player visually recognize the mixed reality space; and a control program which has the program step of managing and controlling the mixed reality space, and distributes player information including the location information and predetermined action detection information detected in the player processing program step, information that is registered in advance and pertains to the real space, and information required for generating the virtual space image to at least the player processing program step other than the player processing program step as a source of the player information.

Still another gist of the present invention lies in a pointer display for pointing an arbitrary location in a mixed reality space expressed by mixing a real space and virtual space, wherein the pointer display in a mixed reality space is made up of not less than n (n is an integer not less than 2) parallel lines in a virtual space.

Still another gist of the present invention lies in a pointer display method for making a pointer display that points an arbitrary location in a mixed reality space expressed by mixing a real space and virtual space, wherein the pointer display is made by a virtual object which is made up of not less than n (n is an integer not less than 2) parallel lines having substantially the same lengths.

Still another gist of the present invention lies in a mixed reality apparatus using a pointer display of the present invention.

Still another gist of the present invention lies in a storage medium which stores a pointer display method of the present invention as a program which can be executed by a computer.

Still another gist of the present invention lies in a mixed reality apparatus using a pointer display method of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6C are views for explaining changes in displayed image in response to command input by an interactive input device;

FIG. 10 is a flow chart showing the display process according to the condition shown in FIG. 9;

DETAILED DESCRIPTION OF THE PREFERRED EMBODIMENTS

A preferred embodiment of the present invention will be described hereinafter with reference to the accompanying drawings. This embodiment will exemplify a game in which three players play while sharing an identical virtual space. However, an MR apparatus according to the present invention can be applied to other arbitrary applications.

Figure 1:
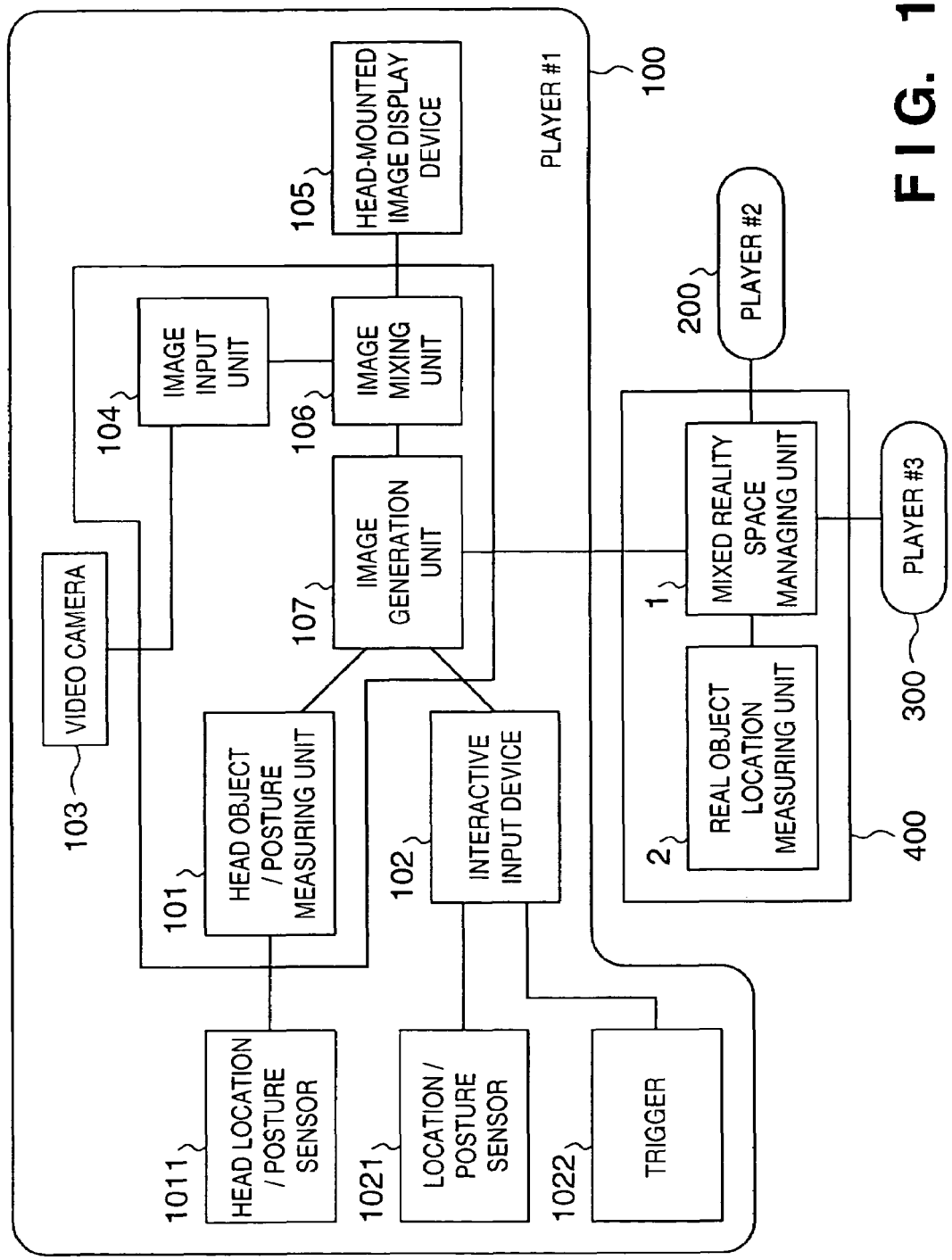
FIG. 1 is a block diagram showing an example of the arrangement of an MR apparatus according to the present invention.

FIG. 1 is a block diagram showing the arrangement of an MR apparatus according to the present invention. FIG. 1 shows the arrangement used when the number of players is three. The MR apparatus comprises player processors 100 to 300 provided in units of players, and a controller 400 connected to the player processors. The number of player processors connected to the controller 400 increases with increasing number of players.

The player processors 100 to 300 have an identical arrangement. That is, each player processor comprises I/O blocks (102, 103, 105, 1011, 1021, 1022) such as sensors, display device, and the like attached to the player's body, and circuit blocks (101, 104, 106, 107) for processing signals captured from the sensors, and generating an image to be displayed on the display device on the basis of the signal processing results and information of other players supplied from the controller.

The arrangement of the player processor will be explained below with reference to FIG. 1 and FIG. 2 that shows the types and locations of I/O devices each player wears in this embodiment.

Figure 2:
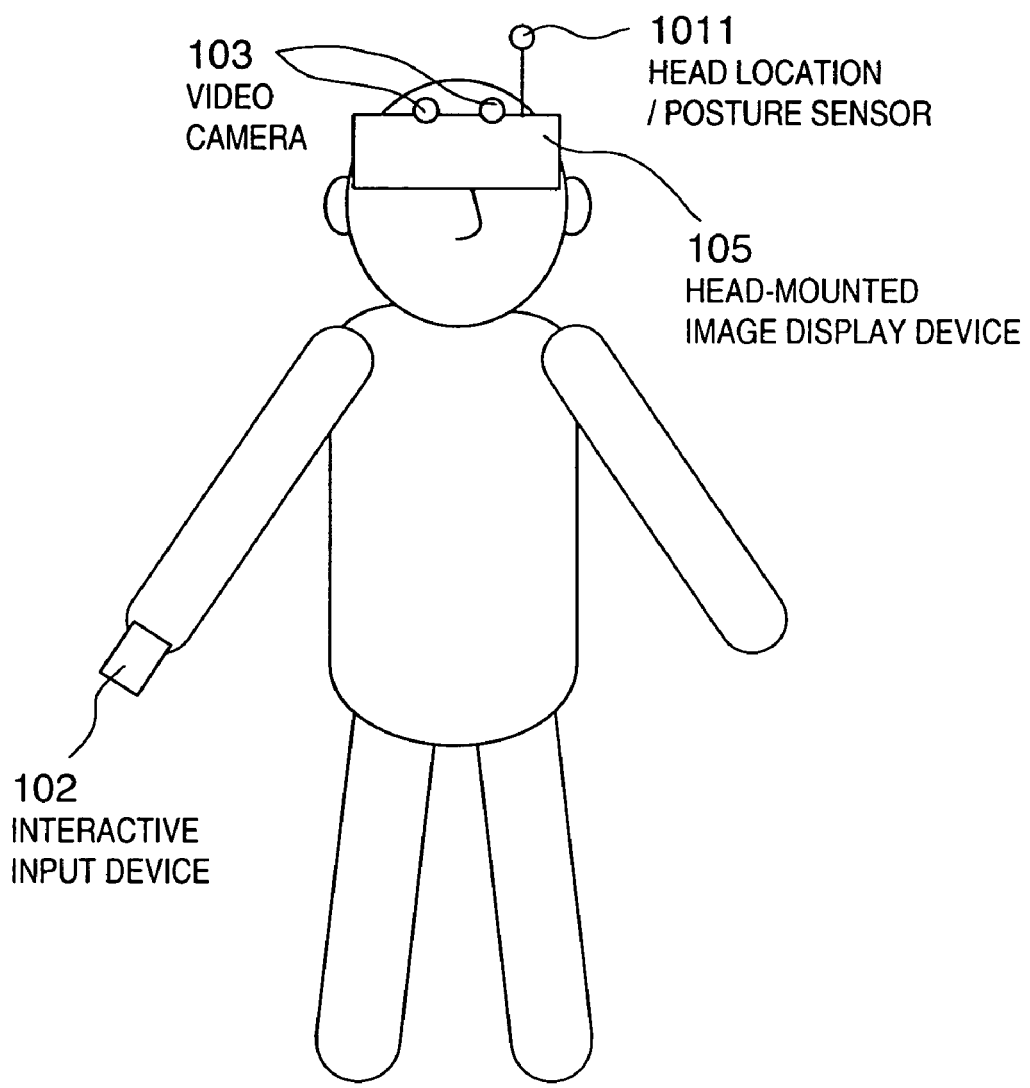
FIG. 2 is a view for explaining the types and locations of devices the player wears.

As shown in FIG. 2, each player wears on his or her head a head-mounted image display device (to be referred to as an HMD hereinafter) 105 as a display device for mixing and displaying real and virtual spaces. In this embodiment, the HMD can be either a video or optical see-through type. In the following description, a case using the video see-through HMD will be explained.

Two small video cameras 103 are provided to portions of the HMD 105, that are near player's eyes. Video data sensed by these video cameras at nearly the same view point as that of the player are supplied to an image mixing unit 106 (to be described later) via an image input unit 104, and are displayed on the HMD 105 of the player after being superimposed on virtual space images (images of virtual objects).

A head location/posture sensor 1011 comprising, e.g., a magnetic sensor, is attached to the head of the player. The sensor 1011 can be attached to the player by using the HMD 105. The output signal from the head location/posture sensor 1011 is processed by a head location/posture measuring unit 101 to obtain information of the head location and posture (tilt direction and amount) of the player.

On the other hand, an interactive input device 102 is attached to a player's arm. The interactive input device 102 has a location/posture sensor 1021 for detecting the location and posture of a portion where the device 102 is attached, and a switch (trigger) 1022 that the player can turn on/off, and is used by the player to input commands by making predetermined actions.

In the following description, a case will be exemplified below wherein a plurality of players (three players in this embodiment) share an identical MR space, play a game for defeating enemies while ducking attacks of enemies appearing in the MR space and competing with other players for the number of enemies he or she shoots down or score until the time or damage by enemy attacks reaches a given level, and can input the following commands using the interactive input device 102.

Command 1 (Sight Command)

A command for displaying a line of sight indicating the sight position in the virtual space. This command is input by locating the wrist above the elbow with the back of the hand facing up.

Command 2 (Shooting Command)

A command for shooting the sight position indicated by the line of sight. This command is input by reciprocally moving the arm (from the elbow to the palm) back and forth at a given acceleration or higher while the line of sight is displayed by the sight command.

Command 3 (Defense Command)

A command for defending against an enemy's attack. This command is input by directing the fingertips upward with the back of the hand facing the enemy.

Command 4 (Reset Command)

A command for re-inputting the sight command after the shooting command is input. This command is input by having the arm hanging down.

More specifically, as routine actions in the game of this embodiment, the player repeats command inputs in a cycle of the sight command→shooting command→reset command→sight command, and inputs the defense command as needed in this cycle.

The command input by the interactive input device 102 is supplied to an image generation unit 107.

The image generation unit 107 transfers the head location/posture information of the player supplied from the head location/posture measuring unit 101 and command information supplied from the interactive input device 102 to the controller 400. Also, the unit 107 generates a virtual space image(s) (an image(s) of virtual object(s)) to be displayed on the HMD 105 of the corresponding player using the head location/posture information and command information of that player, and the head location/posture information, command information, and model information of other players, the location, moving direction, and state information of enemy characters, and information of the locations, shapes, and the like of obstacles laid out in the space, which are received from the controller 400, and outputs the generated image to the image mixing unit 106.

The image mixing unit 106 mixes the image (real space image) captured by the video cameras 103 attached at the positions near the view point of the player, and the virtual space image generated by the image generation unit 107, and supplies the mixed image to the HMD 105 of the player.

The controller 400 comprises an MR space managing unit 1 to which the aforementioned player processors 100 to 300 are connected, and a real object location measuring unit 2. The MR space managing unit 1 distributes information that pertains to the head locations and postures of the players, and the locations, postures, and commands of the interactive input devices 102, which are received from the player processors 100 to 300, and executes game processes such as appearance/disappearance control of enemy characters to be displayed in the virtual space, scoring of shooting input by the shooting command, and the like. Information that pertains to the models, locations, moving directions, and states (e.g., defeated or not) of enemy characters are distributed to all the users connected together with each player information.

Figure 3B:
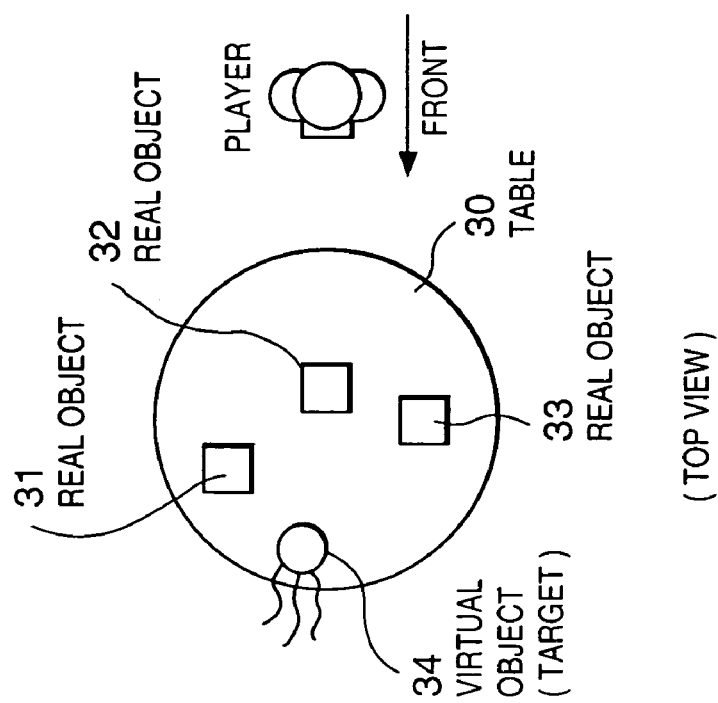
FIGS. 3A and 3B are views for explaining a game in an embodiment of the present invention.
Figure 3A:
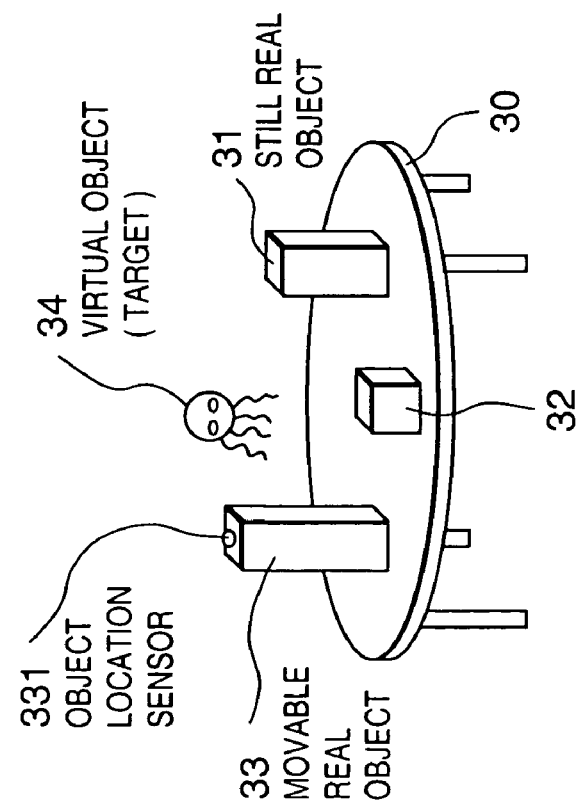

When real objects 31 to 33 are laid out as obstacles to shooting to adjust the game difficulty level, as shown in FIGS. 3A and 3B, the MR space managing unit 1 also manages information that pertains to the shapes and locations of these real objects 31 to 33.

FIG. 3A is a perspective view of a game field (MR space) viewed from a certain player, and FIG. 3B is a top view of the game field. FIGS. 3A and 3B show a case wherein three real space objects 31 to 33 are laid out as obstacles on a table 30 (in the real space). In this embodiment, since the sight command is input by raising the wrist above the elbow using the interactive input device 102, as described above, the real space objects are laid out on the table 30 which is as high as the waist level of a standard body. However, the need for the table can be obviated depending on command input actions using the interactive input device.

In FIGS. 3A and 3B, the real space objects 31 and 32 are fixed in position, and the object 33 is movable. If a movable real space object is provided, the game difficulty level can be dynamically changed. For example, when the movable real object 33 moves to the right and left at a random speed, it is more difficult for a player to shoot an enemy character as a target than a case wherein only the still real objects 31 and 32 are laid out. The movement of the movable real object may be controlled by either the MR space managing unit 1 or another control circuit. In this case, the model of the movable object is managed by the MR space managing unit 1, and its location is obtained by measuring an object location sensor 331 provided to that movable object 33 by the real object location measuring unit 2.

The aforementioned MR apparatus can be implemented by a client-server system which includes the controller 400 as a server, and (the circuit sections of) the player processors 100 to 300 as clients. Since processes that pertain to each player are distributed to and executed by each client, the apparatus can flexibly cope with an increase/decrease in the number of players. More specifically, the player processor can be implemented by a versatile computer having a video I/O function and a signal reception function from various sensors, and the controller 400 can be implemented by a versatile computer having an interface that can communicate with each player processor, and a measurement signal reception function from the object location measuring unit 2.

However, since computations pertaining to three-dimensional image display must be done in real time, a relatively fast computer having an accelerator dedicated to such computations (so-called 3D accelerator) or the like is preferably used. Also, the controller 400 and player processors 100 to 300 are preferably connected via communication lines having a large capacity such as 100BASE-T. If the communication line has a small capacity, the processing speed drops larger with increasing number of players.

(Display by Command Input)

Figure 4:
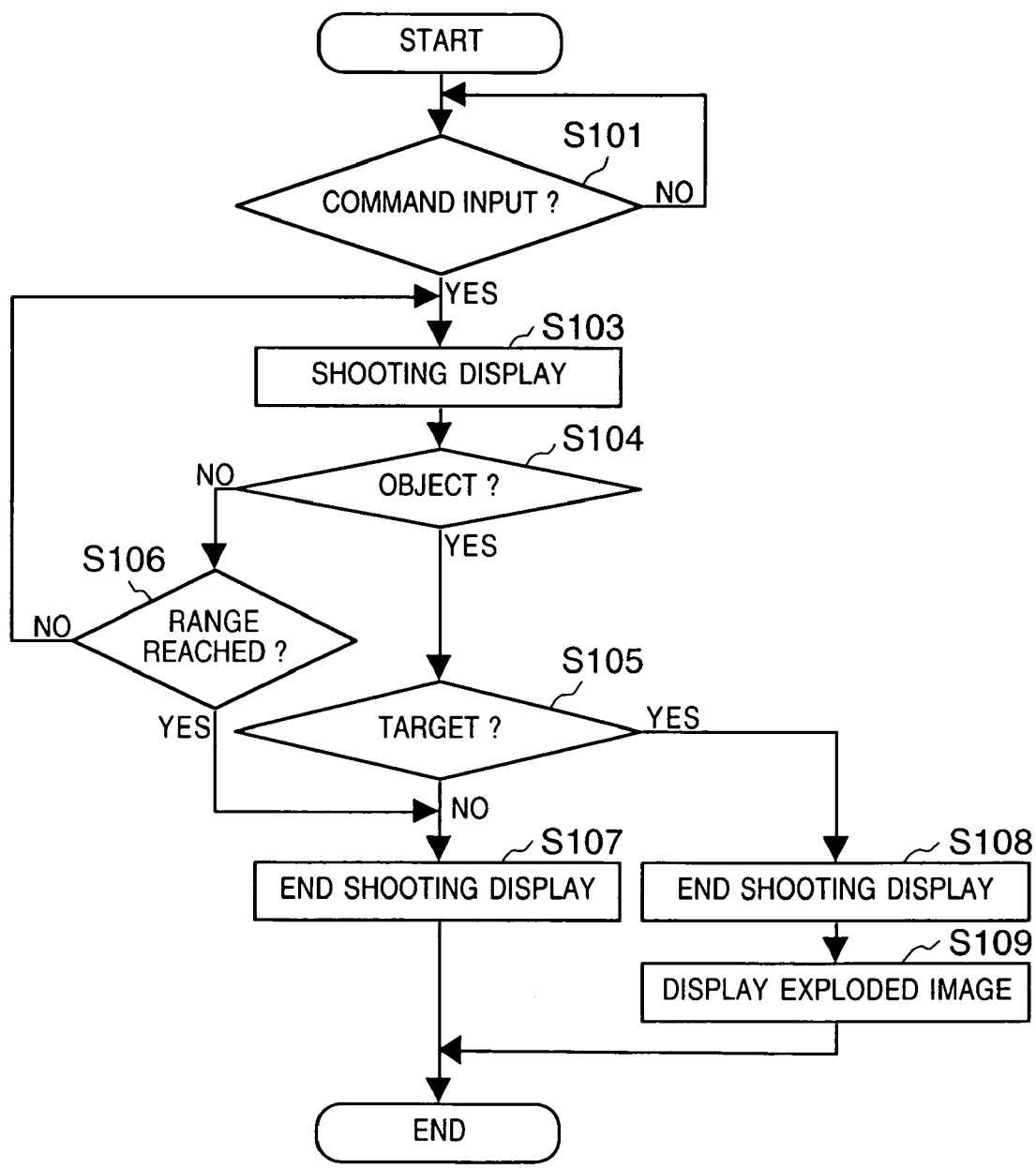
FIG. 4 is a flow chart for explaining a shooting display process by means of command inputs.

Display operation in response to a command input by the interactive input device will be explained below with reference to FIG. 4. FIG. 4 is a flow chart showing the display process executed upon inputting the shooting command.

It is checked if a shooting command is input (step S101). If a shooting command is input, a shooting display process is started (step S103).

It is checked if an object is present in the shooting direction (step S104). If no object is present, the display process is proceeded until a predetermined range is reached (step S106) After an elapse of a predetermined period of time, display is turned off to end the shooting display process (step S107). On the other hand, if an object is present within the range, it is detected if the object is a target (step S105). If the object is a target, the shooting display process ends (step S108), and the display pattern of the target is changed or deformed to, e.g., an exploded pattern so that the player can recognize whether or not he or she shot down the enemy (step S109). On the other hand, if an object other than the target is present within the range, since it obstructs the trajectory, the shooting display process ends (step S107). If the player shoots an object other than the target, a game presentation message "miss" or the like may be displayed.

Whether or not an object is present on the trajectory of shooting, and the location, type, and the like of the object if it is present may be detected before the shooting display process, and display may be made based on the detection results.

(Display Superposed on Player)

The MR apparatus of the present invention is characterized by displaying a virtual space image superposed on the player, and capable of dynamically changing the display contents of that image in accordance with pertinent conditions.

In the MR apparatus, the player must wear a display device such as an HMD or the like to visually confirm a mixed one of the virtual and real spaces. Furthermore, sensors, a switch, and the like which are used to detect player actions are attached to the player to make some action in the MR space. For example, in the game of this embodiment, an HMD or the like is attached to the head, and an interactive input device on an arm. Such devices which are attached to the player (attached devices) are negligible if there is only one player. However, if there are a plurality of players, one player can see the attached devices of another player. For this reason, especially in an application such as a game, the attached devices may often result in poor reality and disturb empathy of the player into the game.

For this reason, the present invention hides and covers at least the attached devices of the player with the virtual space image, thus realizing an entertaining application. Since the virtual space image to be displayed has contents suitable for an application, empathy of the player is promoted, and a novel presentation effect can be added by dynamically changing the displayed image.

Figure 5:
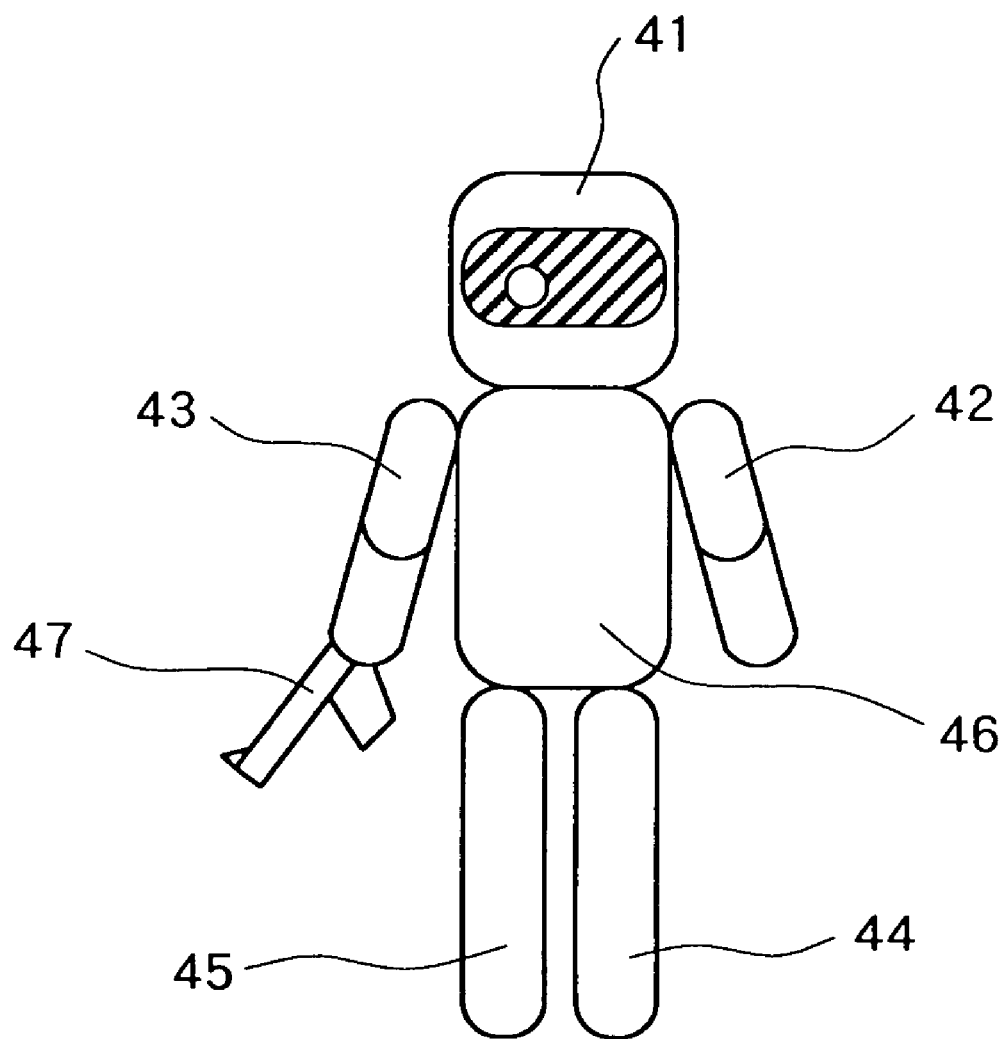
FIG. 5 shows an example of a virtual object superposed on the whole body of the player.

FIG. 5 shows a display example when the virtual space image is superposed on the whole body of the player. A virtual helmet 41 is superposed on the head of the player, and virtual parts 42 to 46 are respectively superposed on the arms, legs, and body. In case of such superpose display, when the player is managed as a model approximated by simple shapes such as columns, rectangular parallelopiped, and the like, the processing loads on the player processor and MR space managing unit can be reduced, and such model can be commonly used for players with different figures. When only the attached devices of the player need be hidden, virtual images can be superposed on only corresponding portions. That is, in case of this embodiment, only the virtual helmet 41 for hiding the HMD and the virtual part 42 or 43 for hiding the interactive input device attached on the right or left arm can be displayed.

Such display control can be implemented by generating images by rendering virtual objects to be superposed using the location/posture information detected by the head location/posture sensor 1011 of another player or the location/posture sensor 1021 provided to the interactive input device, and the aforementioned player model.

As a virtual object to be superposed on the arm to which the interactive input device is attached, an object that simply covers the arm portion may be used. Instead, when an object that represents a function in the game is used, an extra effect can be obtained in addition to hiding of the attached devices. More specifically, when a virtual object that hides the interactive input device includes an object such as a weapon or the like used in the game (or the attached device is hidden by an object such as a weapon or the like), the player can easily confirm a weapon which is currently in use by watching his or her arm especially when he or she can select one of a plurality of types of weapons, and can determine the weapon another player has selected.

Also, the virtual object to be displayed can be changed or deformed in response to a command input by the interactive input device. FIGS. 6A to 6C show an example in which a virtual object changes from a weapon to a shield when the aforementioned defense command is input. More specifically, in the state shown in FIG. 6A that shows a reset command input action, when the player makes a defense command input action, i.e., directs the fingertips upward with the back of the hand facing outside so as to prepare for an attack from an enemy or an oncoming enemy (FIG. 6B), display of a weapon 47 disappears, and a virtual object including a shield 47' is displayed instead (FIG. 6C).

Figure 7:
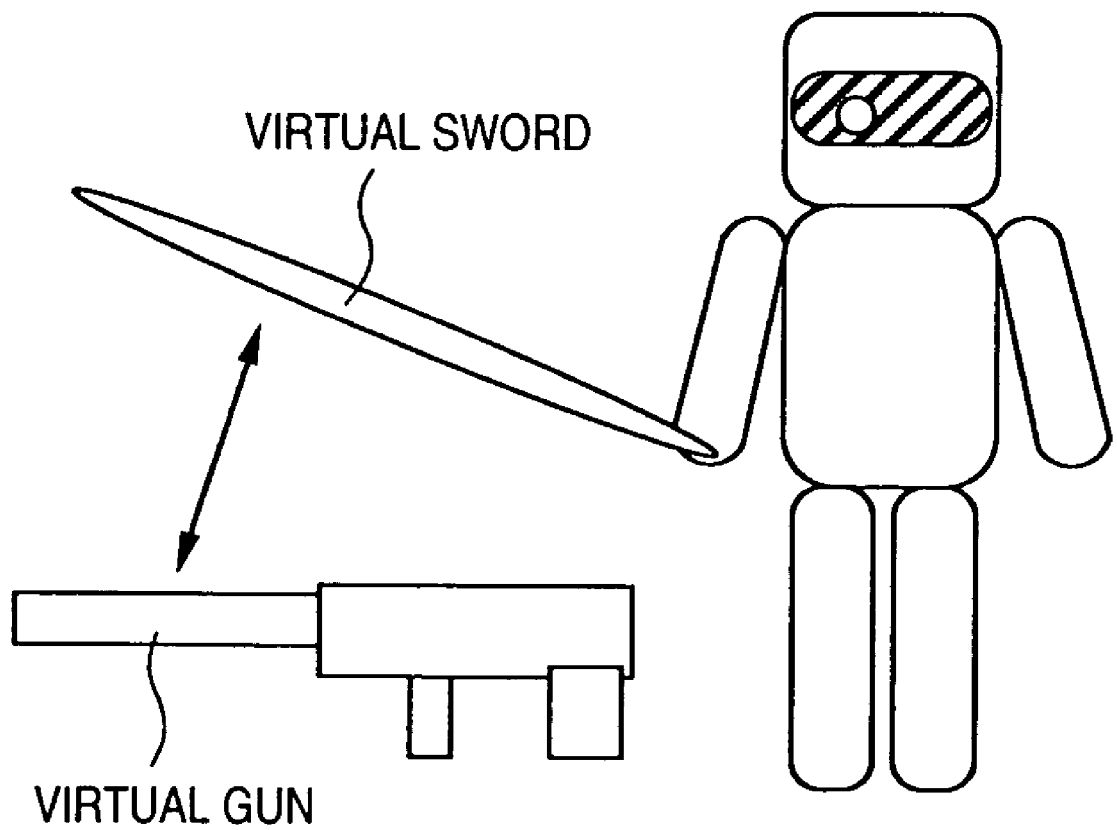
FIG. 7 shows an example of changes in displayed image in accordance with player's choice.

FIGS. 6A to 6C show a case wherein the player who input the defense command is viewed from another player. The player himself or herself who input the defense command looks the virtual object including the shield 47' from the back side, and can experience the feeling as if he or she were defending using a shield in practice. FIG. 7 shows a display example in which a virtual object to be displayed changes depending on the type of weapon (sword and gun) the player selected.

As conditions for changing the display contents, not only an active game action of the player, i.e., the command input, but also the location information of a location change input unit due to movement or the like of the player can be used. FIGS. 8A to 8D show an example in which display is changed using the visual axis information of the player.

In the example shown in FIGS. 8A to 8D, the position and size of a virtual eye displayed within the virtual helmet, and a visual effect are changed. More specifically, the virtual eye may move (FIGS. 8A and 8B) in accordance with the visual axis direction of the player. Using such changes in display, the player can recognize the direction in which another player is gazing. Alternatively, the display size of the virtual eye may be increased as the visual axis direction of the player becomes closer to that of another player (FIG. 8C), or the display luminance of the virtual eye may be increased or the virtual eye may be flickered (FIG. 8D) when the visual axis direction agrees with that of another player. Using such changes in display, a given player can recognize the player who is watching that player. In a game in which a player set his or her sight on a target like in this embodiment, since the visual axis direction is normally close to the line-of-sight direction, the visual axis information is useful upon planning the game strategy.

Figure 9:
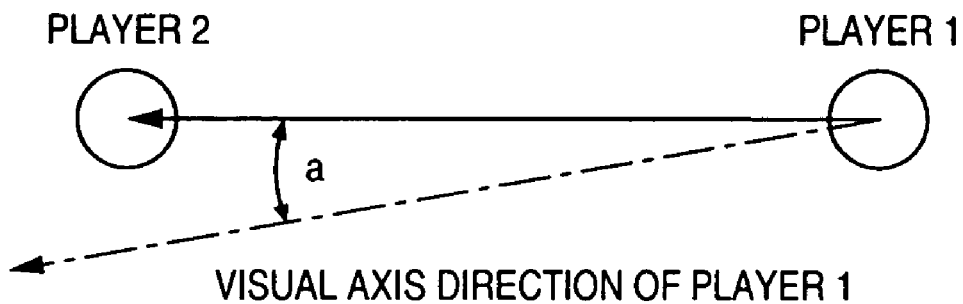
FIG. 9 is a view for explaining an example of a condition upon implementing the changes in display shown in FIGS. 8A to 8D.

In order to implement such changes in display, for example, as shown in FIG. 9, deviation angle a between the direction of player 1 with respect to player 2 and the visual axis direction is computed from location information of the individual players and visual axis information of player 1, and display is changed in correspondence with changes in angle a.

In general, since the player watches the line-of-sight direction, display control shown in FIGS. 8A to 8D may be done on the basis of information of the direction in which the sight is set by the interactive input device.

An example of display control will be explained below with reference to FIG. 10. FIG. 10 is a flow chart showing the processes executed when display changes in the order of FIG. 8A→FIG. 8C→FIG. 8D on the basis of the condition shown in FIG. 9 using the visual axis information and location information.

The head location/posture information and view point position information of another player (player 1 in FIG. 9) and oneself (player 2 in FIG. 9) are acquired (steps S201 and S202). A direction that minimizes the distance to the other player is computed (step S203).

The visual axis direction of the other player is computed (step S204), and the angular difference (angle a in FIG. 9) from the direction computed in step S203 is obtained (step S205). This angular difference is compared with a table which is pre-stored in the image generation unit 107, and stores the correspondence between the angular difference and the virtual eye size to acquire the virtual eye size (step S206).

Figure 8B:
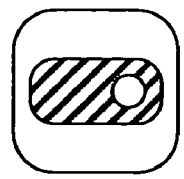
FIGS. 8A to 8D show an example of changes in displayed image in correspondence with the visual axis direction of another player.
Figure 8A:
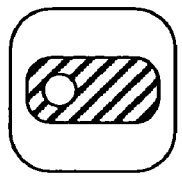
Figure 8C:
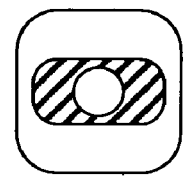
Figure 8D:
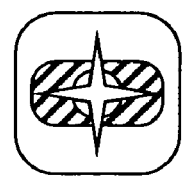

After the virtual eye size is acquired, the size of the superposed virtual eye is updated, and the virtual eye is displayed again (step S207). It is checked if the angular difference is equal to or smaller than a predetermined value (step S208). If the angular difference is equal to or smaller than the predetermined value, a visual effect shown in FIG. 8D is additionally displayed (step S209).

The virtual objects and player model to be superposed are managed by the MR space managing unit 1. Each virtual object model is a three-dimensional model, and the way the model looks changes depending on the view point position. That is, when a given player watches a player who turns his or her face sideways, that player can see the side surface of the virtual helmet.

(Pointer Display)

Figure 11A:
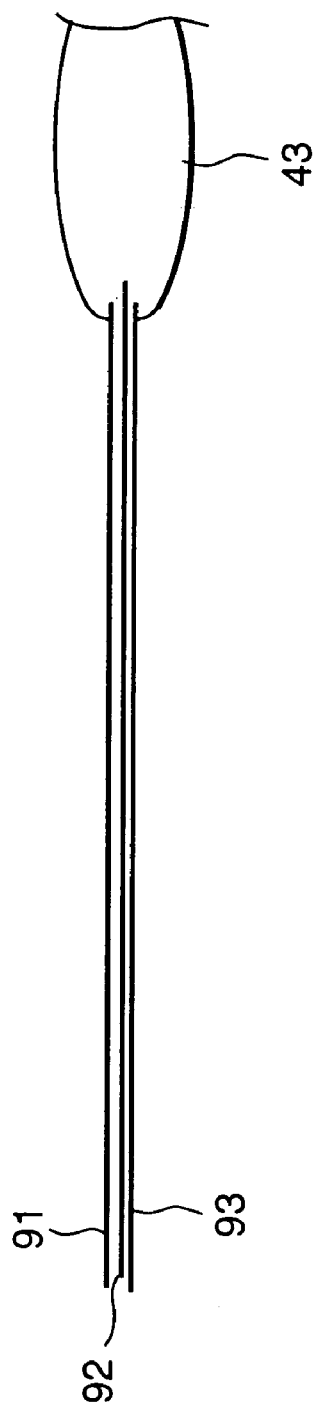
FIGS. 11A and 11B are views for explaining a pointer display method according to the present invention.
Figure 11B:
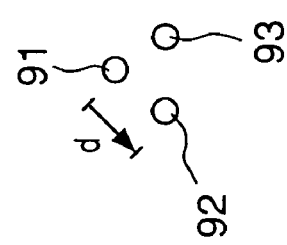

FIGS. 11A and 11B show an example of a pointer display for setting the sight. When one point in the space shared by a plurality of players must be pointed, the pointed point must be clearly recognized by not only the player who is pointing but also other players. Furthermore, when a pointer display is large or thick, contents displayed in the field of view are complicated very much and may disturb progress of the game. Also, since one point in the space is pointed, it is not easy to recognize the distance to that point.

In the present invention, a pointer display is made using a plurality of parallel lines laid out at equal intervals. FIG. 11A shows a case wherein a pointer display uses three parallel lines 91 to 93 with a predetermined length to have as a start point a distal end portion of the virtual part 43 which is displayed to hide the interactive input device attached to the player. The parallel lines 91 to 93 are laid out to pass through the vertices of a regular triangle when viewed from the front side, as shown in FIG. 11B. Spacing d between neighboring parallel lines 91 to 93 can be appropriately determined in accordance with the area of the space that can be pointed, but requires approximately several cm (around 3 to 5 cm) to make the pointing direction clear, as will be described later.

Figure 12C:
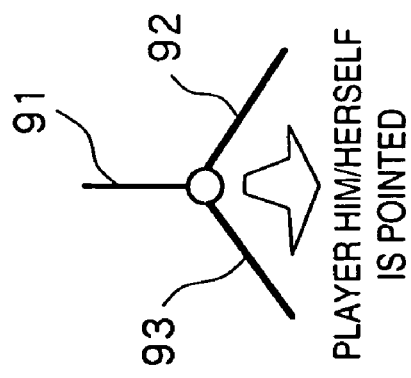
FIGS. 12A to 12C are views for explaining changes the way an object looks in correspondence the display start point when the pointer display method of the present invention is used.
Figure 12B:
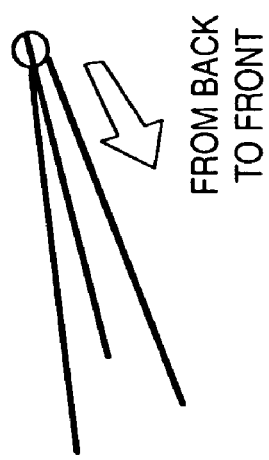
Figure 12A:
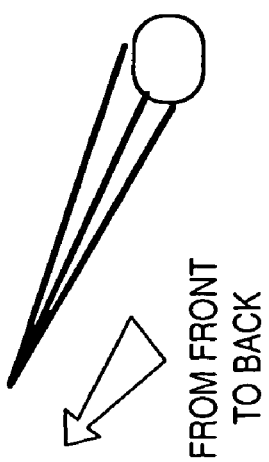

By making such pointer display, a portion (irrespective of whether it is in a virtual or real space) that overlaps the pointer display is not hidden by the pointer display, and the distance to the pointed point and the pointed direction can be recognized more easily. More specifically, as shown in FIGS. 12A to 12C, the player who is pointing can see the pointer display, as shown in FIG. 12A, and can easily recognize the pointed point in the space. By contrast, since a player who is located at a position nearly in front of the player who is pointing can see the pointer display, as shown in FIG. 12B, he or she can recognize that a pointer display is made toward his or her side. Also, since the pointer display can be seen from a position directly opposite thereto, as shown in FIG. 12C, a target player can recognize it in a game application in which a sight is set on an opponent player using the pointer display.

Figure 13:
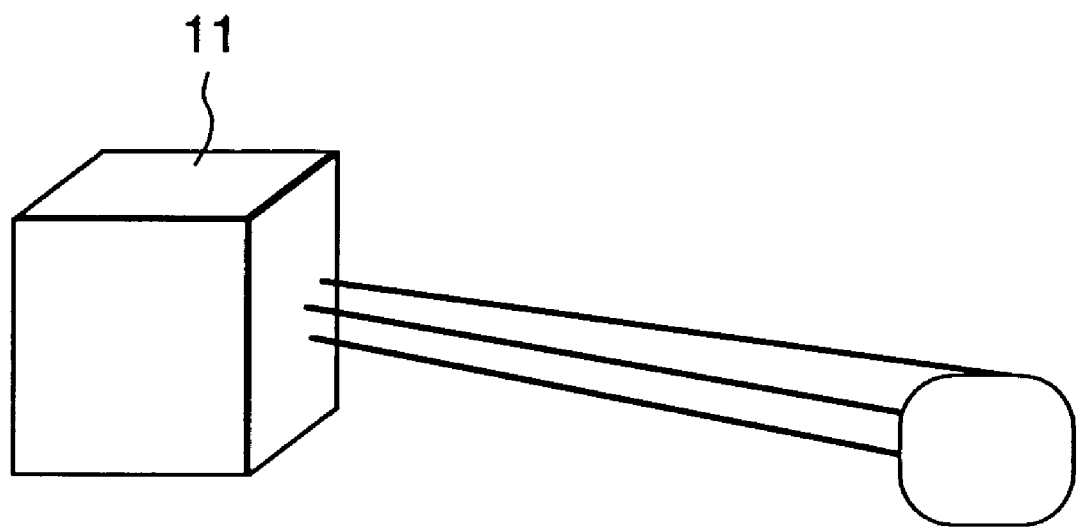
FIG. 13 shows an example for making the user recognize the presence of an object more clearly using the pointer display method of the present invention.

The pointer display can be used not only to point one point in a space but also to make the presence of an object clearer. In FIG. 13, since the lines of the pointer display are displayed to contact positions to an object 11 (which can be either a virtual object or an object placed in the real space), the player can recognize the presence of the object there.

Figure 14:
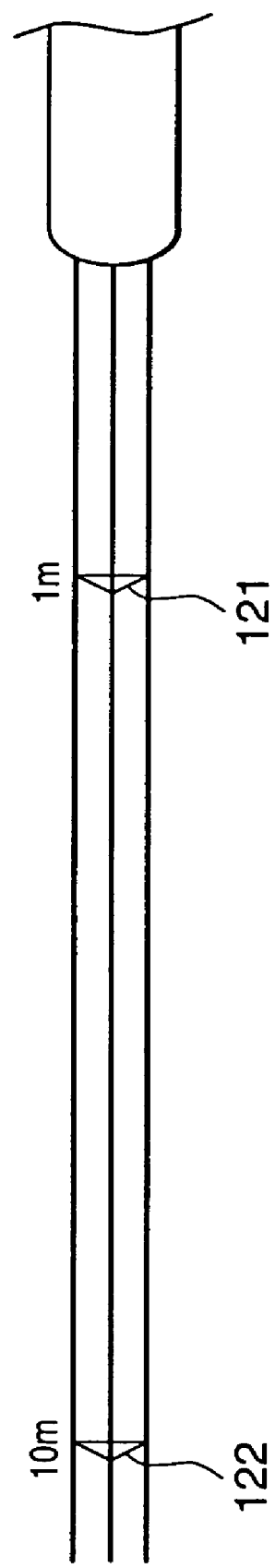
FIG. 14 is a view showing another example of a pointer display method of the present invention.
Figure 15:
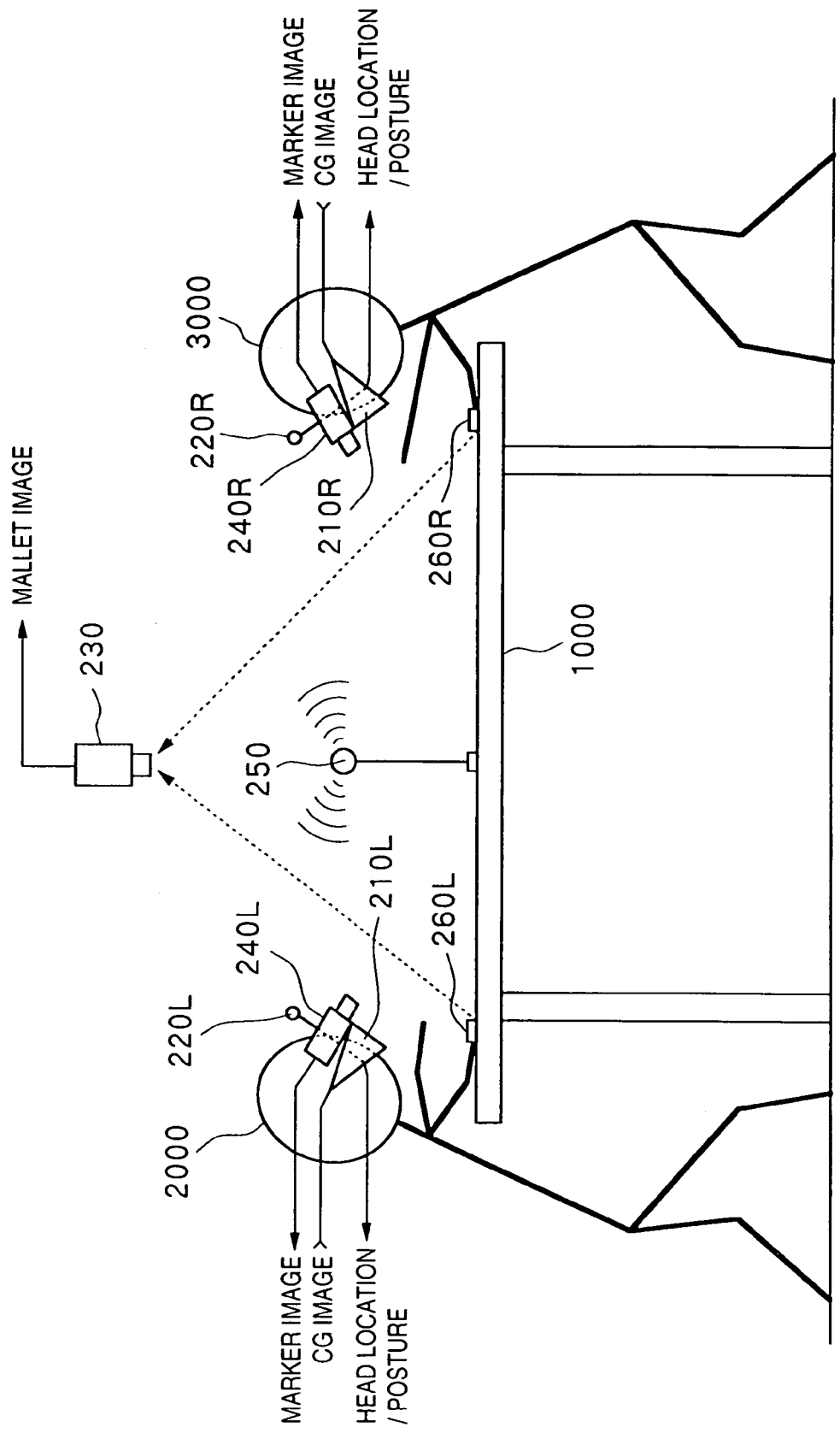
FIG. 15 is a view for explaining a hockey game exploiting conventional MR.
Figure 16:
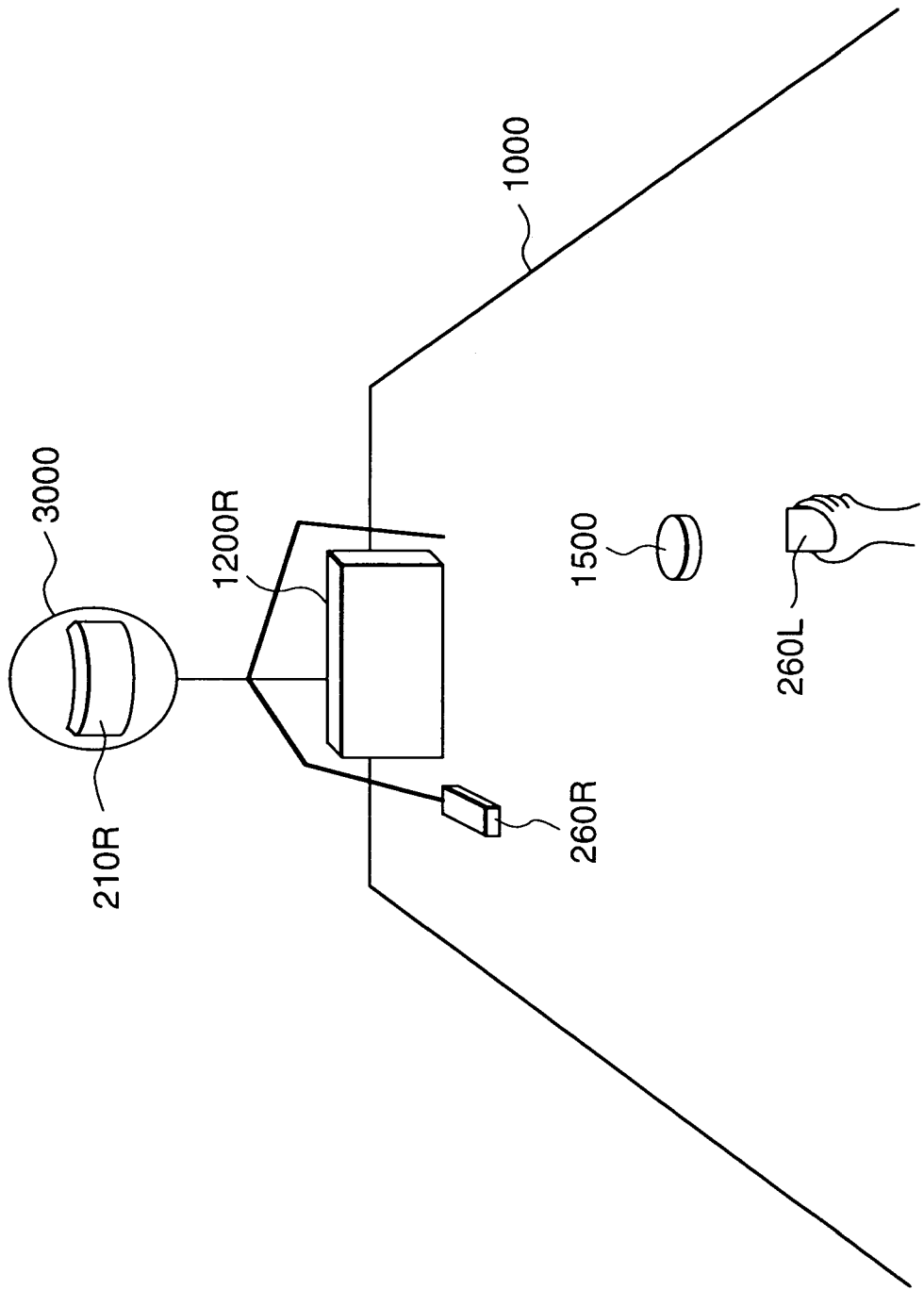
FIG. 16 is a view for explaining a hockey game exploiting conventional MR.

Also, as shown in FIG. 14, when scale marks 121 and 122 are added at equal intervals to the lines of the pointer display, the distance can be recognized more clearly. In this case, the scale marks need not be set at equal intervals but logarithmic scale marks may be used.

In the above embodiment, the apparatus has no physical feedback means for the player. For example, a device that physically stimulates the player such as a vibrator may be built in a band for fixing the HMD or the interactive input device, and may feed back an action to the player in accordance with the game situation. For example, when a given player defends against an enemy's attack or defeats an enemy in the vicinity of the player, vibration as shock may be given to the player, thus providing a real presentation effect.

The controller may distribute all data to all the player processors or may distribute data required for a given player processor. When the controller distributes all data, each player processor selectively uses only required data.

In the arrangement of the embodiment, the outputs from the video cameras 103 are input to only the image input unit 104. Also, these outputs can be supplied to the head location/posture measuring unit 101 as correction information for the head location/posture sensor 1011. In this case, when an object whose absolute coordinate position does not change such as a table, a real space object placed as an obstacle, or the like is marked in a color that can be easily detected by an image process, correction is easy.

The number of parallel lines used as the pointer display is not limited to three, but can be selected from arbitrary values. In this case, three or more lines are preferably used to allow easy recognition of distance. On the other hand, when too many lines are used, a portion that overlaps the pointer display becomes hard to see, or complexity increases with increasing number of players. Hence, the number of parallel lines can be appropriately determined in correspondence with the space size and the number of players.

In the above embodiment, commands are input by detecting actions of the interactive input device without using the trigger 1022. Alternatively, the player may input various commands using the trigger 1022, or detected actions and the ON/OFF state of the trigger may be combined. Furthermore, a switch which is turned on/off in correspondence with player actions may be built in the interactive input device and may be used as the trigger.

The objects of the present invention are also achieved by supplying a storage medium (or recording medium), which records a program code of a software program that can implement the functions of the above-mentioned embodiments to a system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, since an MR apparatus which allows a plurality of players to share an identical MR space is separately constructed by a section that executes processes inherent to each player, and a section for making the overall MR space management, the number of players can be easily increased/decreased.

Since virtual objects are laid out to hide user attached devices which are indispensable for the MR apparatus, the user can experience more real mixed reality, and a game presentation effect can be implemented in an application such as a game. Also, such virtual objects can improve the operability experienced by the player.

In addition, since the pointer display for pointing a point in a space is made using a plurality of parallel lines in place of planes, even when the number of persons who make pointing inputs increases or the space is narrow, the original display contents can be prevented from being disturbed by the pointer display. Since the pointer display is made up of lines, the processing load is light, and the distance to the pointed point can be easily recognized.

As many apparently widely different embodiments of the present invention can be made without departing from the spirit and scope thereof, it is to be understood that the invention is not limited to the specific embodiments thereof except as defined in the appended claims.

What is claimed is:

1. A mixed reality presentation method of displaying to a player a mixed reality space obtained by mixing real space and virtual space, comprising the steps of:
   detecting a location of the player;
   detecting a location of a controller operated by the player;
   inputting an image of the real space;
   generating a first image of the virtual space corresponding to the detected location of the player by using model information of the player;
   generating a pointer display corresponding to the location of the controller as a second image of the virtual space;
   generating an image of the mixed reality space by mixing the first and second images of the virtual space with the image of the real space; and
   displaying the image of the mixed reality space to the player, wherein the pointer display is made up of not less than n (n is an integer not less than 2) parallel lines each of which passes through vertices of a regular n-sided polygon.

2. The method according to claim 1, further comprising the steps of:
   detecting a posture of the player; and
   detecting a posture of the controller,
   wherein said step of generating a pointer display generates a pointer display corresponding to the location and the posture of the controller as a second image of the virtual space.

3. The method according to claim 1, wherein a length of the n parallel lines and a spacing between two neighboring parallel lines are defined to be values determined by a size of the mixed reality space.

4. The method according to claim 1, wherein a length of the n parallel lines and a spacing between two neighboring parallel lines are defined to be visually recognized with a distance in the mixed reality space.

5. The method according to claim 1, further comprising:
   generating a third image of the virtual space and mixing the third image with the image of the real space so that the third image covers the controller and a predetermined portion of the player in the image of the real space.

6. The method according to claim 5, wherein the n lines comprise the pointer display starting from substantially a distal end portion of the third image of the virtual space.

7. The method according to claim 1, wherein the position display further comprises an image representing scale marks.

8. A storage medium which stores the mixed reality presentation method of claim 1 as a program which can be executed by a computer.

9. A mixed reality apparatus for displaying to a player a mixed reality space obtained by mixing real space and virtual space, comprising:
   a first detecting unit adapted to detect a location of the player;
   a second detecting unit adapted to detect a location of a controller operated by the player;
   an inputting unit adapted to input an image of the real space;
   a first generating unit adapted to generate a first image of the virtual space corresponding to the detected location of the player by using model information of the player;
   a second generating unit adapted to generate a pointer display corresponding to the location of the controller as a second image of the virtual space;
   a third generating unit adapted to generate an image of the mixed reality space by mixing the first and second images of the virtual space with the image of the real space; and
   a displaying unit adapted to display the image of the mixed reality space to the player;
   wherein the pointer display is made up of not less that n (n is an integer not less than 2) parallel lines each of which passes through vertices of a regular n-sided polygon.

10. A mixed reality presentation method comprising:
an input step of inputting a sensed image sensed by a camera of a first player;
a first detection step of detecting first location information representing locations of plural portions of the first player;
a second detection step of detecting second location information representing locations of plural portions of the second player;
a virtual image generating step of generating a virtual image to be superimposed on an image of the second player included in the sensed image based on the first and second location information and a player model; and
a mixed reality image generating step of generating a mixed reality image to be presented to the first player and representing the mixed reality space, by mixing the virtual image with the sensed image.

11. The method according to claim 10, wherein the plural portions including the head of the player on which a display device is worn through which the first or the second player experiences the mixed reality, respectively.

12. The method according to claim 10, wherein said second detection step also detects command information and said virtual image generating step varies the virtual image based on the command information.

13. The method according to claim 10, wherein the player model is a model that approximates a player using simple shapes.

14. The method according to claim 10, further comprising a visual axis detection step of detecting visual axes of the first and the second player, and wherein said virtual image generating step varies the virtual image based on a relation between the location and visual axis of the first player and the location and visual axis of the second player.

15. The method according to claim 10, wherein the first location information further represents postures of the plural portions of the first player and the second location information further represents postures of the plural portions of the second player.

16. A mixed reality presentation apparatus comprising:
an input unit adapted to input a sensed image sensed by a camera of a first player;
a first detection unit adapted to detect first location information representing locations of plural portions of the first player;
a second detection unit adapted to detect second location information representing locations of plural portions of the second player;
a virtual image generating unit adapted to generate a virtual image to be superimposed on an image of the second player included in the sensed image based on the first and second location information and a player model; and
a mixed reality image generating unit adapted to generate a mixed reality image to be presented to the first player and representing the mixed reality space, by mixing the virtual image with the sensed image.

17. A computer-readable storage medium storing codes for performing steps comprising:
an input program step of inputting a sensed image sensed by a camera of a first player;
a first detection program step of detecting first location information representing locations of plural portions of the first player;
a second detection program step of detecting second location information representing locations of plural portions of the second player;
a virtual image generating program step of generating a virtual image to be superimposed on an image of the second player included in the sensed images based on the first and second location information and a player model; and
a mixed reality image generating program step of generating a mixed reality image to be presented to the first player and representing the mixed reality space, by mixing the virtual image with the sensed image.

18. A mixed reality presentation method of three-dimensionally displaying a pointer for pointing at a three-dimensional point within a mixed reality space that is represented by mixing a real space and a virtual space, comprising the steps of:
obtaining location and posture information of a player;
obtaining location and posture information of a unit operated by the player;
generating a virtual image of a pointer display that comprises n parallel lines each of which passes through vertices of a regular n-sided polygon (n is an integer not less than 2) based on the location and posture information of the player and of the unit; and
mixing the virtual image of the pointer display with a real space image to represent the mixed reality space to the player.

19. The method according to claim 18, wherein the virtual image further includes an image covering said unit, and wherein the pointer display starts from an edge of the image covering the unit.

20. A computer-readable storage medium which stores the mixed reality presentation method of claim 18 as a program which can be executed by a computer.

* * * * *

UNITED STATES PATENT AND TRADEMARK OFFICE
CERTIFICATE OF CORRECTION

PATENT NO.         : 6,972,734 B1
APPLICATION NO. : 09/510232
DATED                : December 6, 2005
INVENTOR(S)       : Toshikazu Ohshima et al.

It is certified that error appears in the above-identified patent and that said Letters Patent is hereby corrected as shown below:

COVER PAGE
(56) References Cited, FOREIGN PATENT DOCUMENTS,
"6-716131" should read --6-176131--.

Signed and Sealed this

First Day of August, 2006

JON W. DUDAS
*Director of the United States Patent and Trademark Office*